US012770997B2

(12) United States Patent
Peng

(10) Patent No.: US 12,770,997 B2
(45) Date of Patent: Oct. 20, 2026

(54) BUTTON CELL AND ELECTRONIC DEVICE

(71) Applicant: ZHUHAI COSMX BATTERY CO., LTD., Zhuhai (CN)

(72) Inventor: Ning Peng, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 784 days.

(21) Appl. No.: 18/069,633

(22) Filed: Dec. 21, 2022

(65) Prior Publication Data

US 2023/0120563 A1 Apr. 20, 2023

Related U.S. Application Data

(63) Continuation of application No. PCT/CN2021/135533, filed on Dec. 3, 2021.

(30) Foreign Application Priority Data

Dec. 4, 2020 (CN) ......................... 202022901163.0

(51) Int. Cl.
*H01M 50/645* (2021.01)
*H01M 50/109* (2021.01)
(Continued)

(52) U.S. Cl.
CPC ....... *H01M 50/645* (2021.01); *H01M 50/109* (2021.01); *H01M 50/153* (2021.01); *H01M 50/181* (2021.01); *H01M 50/188* (2021.01)

(58) Field of Classification Search
CPC ............. H01M 50/645; H01M 50/109; H01M 50/153; H01M 50/181; H01M 50/188;
(Continued)

(56) References Cited

U.S. PATENT DOCUMENTS

2002/0081483 A1* 6/2002 Nemoto ............ H01M 50/3425 429/94
2007/0117011 A1* 5/2007 Myerberg ............ B32B 15/017 428/615
(Continued)

FOREIGN PATENT DOCUMENTS

CN 107946496 A 4/2018
CN 207587784 U 7/2018
(Continued)

OTHER PUBLICATIONS

International Search Report and Written Opinion for International Application No. PCT/CN2021/135533, dated Mar. 2, 2022.
(Continued)

*Primary Examiner* — Matthew T Martin
*Assistant Examiner* — Bartholomew A Hornsby

(57) ABSTRACT

A button cell and an electronic device relate to the technical field of batteries. The button cell includes a housing (10) and a cover assembly (20); the housing includes a bottom wall (11) and an annular side wall (12); the cover assembly includes a top cover (21) having a through hole at its central area and a conductive member (22) covering the through hole; an outer edge of the top cover (21) is welded with a top of the side wall (12) to form an accommodating chamber (101) for accommodating an electrode assembly (30) and an electrolyte; and the conductive member (22) is disposed on a side of the top cover (21) facing the accommodating chamber (101), and the electronic device includes the button cell.

7 Claims, 7 Drawing Sheets

(51) Int. Cl.
*H01M 50/153* (2021.01)
*H01M 50/181* (2021.01)
*H01M 50/188* (2021.01)

(58) Field of Classification Search
CPC ........... H01M 10/0427; H01M 50/169; H01M 2220/30; H01M 50/186; H01M 50/627; H01M 50/636; Y02E 60/10
See application file for complete search history.

(56) References Cited

U.S. PATENT DOCUMENTS

| | | | | |
|---|---|---|---|---|
| 2014/0020241 A1* | 1/2014 | Kawada | .............. | H01M 50/636 29/623.2 |
| 2015/0358441 A1* | 12/2015 | Iwamoto | ............ | H01R 13/5219 455/90.3 |
| 2022/0021087 A1* | 1/2022 | Guo | .................... | H01M 50/547 |

FOREIGN PATENT DOCUMENTS

| | | | |
|---|---|---|---|
| CN | 109192889 | A | 1/2019 |
| CN | 111613739 | A | 9/2020 |
| CN | 111900275 | A | 11/2020 |
| CN | 111989800 | A | 11/2020 |
| CN | 213520130 | U | 6/2021 |
| EP | 3886239 | A1 | 9/2021 |
| EP | 4170784 | A1 | 4/2023 |
| JP | S58176360 | U | 11/1983 |
| JP | H0290457 | A | 3/1990 |
| JP | 2001143763 | A | 5/2001 |
| JP | 2023511884 | A | 3/2023 |
| JP | 2023529378 | A | 7/2023 |
| WO | WO2020037535 | A1 | 2/2020 |

OTHER PUBLICATIONS

Notice of Reasons for Refusal dated Jan. 22, 2024 for Japanese Patent Application No. 2022-580363.
Extended European Search Report dated Dec. 22, 2023 for European Patent Application No. 21900120.3.

* cited by examiner

BUTTON CELL AND ELECTRONIC DEVICE

The present application is a continuation of International Application No. PCT/CN2021/135533, filed on Dec. 3, 2021, which claims priority to Chinese Patent Application No. 202022901163.0, filed with the China National Intellectual Property Administration on Dec. 4, 2020, and entitled with "BUTTON CELL AND ELECTRONIC DEVICE". The disclosures of the aforementioned applications are incorporated by reference herein by reference in their entireties.

TECHNICAL FIELD

The present disclosure relates to the technical field of batteries, in particular, to a button cell and an electronic device.

BACKGROUND

A button cell refers to a cell that is shaped like a button, and generally has a large diameter and a thin thickness. Due to the small volume of the button cell, it has been widely used in a variety of miniature electronic devices, for example, the wearable electronic device field and the medical product field and the like.

In the prior art, the button cell includes a housing, a conductive member and a sealing member. The housing is provided with a through hole that communicates with a chamber for accommodating an electrolyte, the conductive member covers the through hole and is disposed outside of the button cell, and the conductive member is attached to the housing through a sealing rubber ring; and the sealing member covers an injection port of the conductive member.

However, since the interior of the button cell is a closed space, the existing button cell has a problem of low safety and stability.

SUMMARY

The present disclosure provides a button cell and an electronic device to solve the problem that the safety and stability of the existing button cell are low.

On the one hand, the present disclosure provides a button cell including a housing and a cover assembly;

- the housing includes a bottom wall and an annular side wall, a bottom end of the side wall and the bottom wall being integrally formed;
- the cover assembly includes a top cover having a through hole at its central area and a conductive member covering the through hole, the conductive member being connected with the top cover in an insulated manner;
- an outer edge of the top cover is welded with a top of the side wall to form an accommodating chamber for accommodating an electrode assembly and an electrolyte, an outer surface of the outer edge of the top cover has a welding mark, and a welding penetration extends in a direction from the top cover to the side wall; and
- the conductive member is disposed on a side of the top cover facing the accommodating chamber.

In an optional implementation, the conductive member is provided with an injection port for injecting the electrolyte into the accommodating chamber;

- the cover assembly further includes a sealing member covering the injection port, and the sealing member is located on a side of the conductive member facing away from the accommodating chamber.

In an optional implementation, a boss arranged through the through hole is disposed on the conductive member, the boss is disposed on a surface of the conductive member abutting against the top cover; and a side of the conductive member facing the accommodating chamber is a plane.

In an optional implementation, the injection port penetrates the boss, and a center of the boss coincides with a center of the injection port.

By hermetically connecting the boss with a hole wall of the through hole through a sealing rubber ring, a contact area between the conductive member and the through hole is further increased, which not only improves the hermeticity between the conductive member and the through hole, but also enhances the tolerance of the conductive member to the pressure inside the button cell.

In an optional implementation, an end surface of the boss away from the accommodating chamber flushes with an end surface of the housing away from the accommodating chamber; or the end surface of the boss away from the accommodating chamber is located between the end surface of the housing away from the accommodating chamber and an end surface of the housing close to the accommodating chamber.

In an optional implementation, an end of the boss away from the accommodating chamber is provided with a counter bore, the counter bore communicates with the injection port, and a center of the counter bore coincides with the center of the injection port.

After the electrolyte is injected into the accommodating chamber through the injection port, a joint between the sealing member and the counter bore is welded outside the top cover, thereby improving the sealing performance between the sealing member and the injection port.

In an optional implementation, a distance between the end surface of the boss away from the accommodating chamber and an end surface of the boss close to the accommodating chamber is 0.1 mm-0.5 mm In an optional implementation, a sealing rubber ring is disposed between the conductive member and the top cover.

In an optional implementation, a groove is disposed on a side of the sealing member facing away from the accommodating chamber, the groove forms a thinning area, and a center of the thinning area coincides with the center of the injection port.

By disposing the thinning area in the sealing member, the pressure inside the button cell may be released and reduced from the thinning area to realize the purpose that the pressure inside the button cell can be discharged in advance, thereby reducing the damage caused by the cell explosion.

On the other hand, the present disclosure also provides an electronic device including an electronic device body and the button cell of any one of the above, and the button cell providing electric energy for the electronic device body.

The present disclosure provides a button cell and an electronic device, the button cell includes a housing and a cover assembly; the housing includes a bottom wall and an annular side wall, and a bottom end of the side wall and the bottom wall are integrally formed; the cover assembly includes a top cover having a through hole at its central area and a conductive member covering the through hole, and the conductive member is connected with the top cover in an insulated manner; an outer edge of the top cover is welded with a top of the side wall to form an accommodating chamber for accommodating an electrode assembly and an electrolyte, an outer surface of the outer edge of the top cover has a welding mark, and a welding penetration extends in a direction from the top cover to the side wall; and the conductive member is disposed on a side of the top cover facing the accommodating chamber. By disposing the conductive member on the side of the top cover facing the accommodating chamber, an extrusion force of the conductive member to the top cover is larger than an adhesive force between a conductive member disposed on a side of a top cover away from the accommodating chamber and the top cover in the prior art, thereby increasing the tolerance of the conductive member to the pressure inside the button cell, reducing the damage caused by the button cell explosion, and improving the safety and stability of the button cell.

BRIEF DESCRIPTION OF DRAWINGS

In order to more clearly explain technical solutions of embodiments of the disclosure or in the prior art, the drawings required in the description of the embodiments or the prior art will be briefly described below. Obviously, the drawings in the description below are some embodiments of the disclosure, and for those of ordinary skill in the art, other drawings may be obtained from these drawings without creative effort.

REFERENCE NUMERALS

Figure 1:
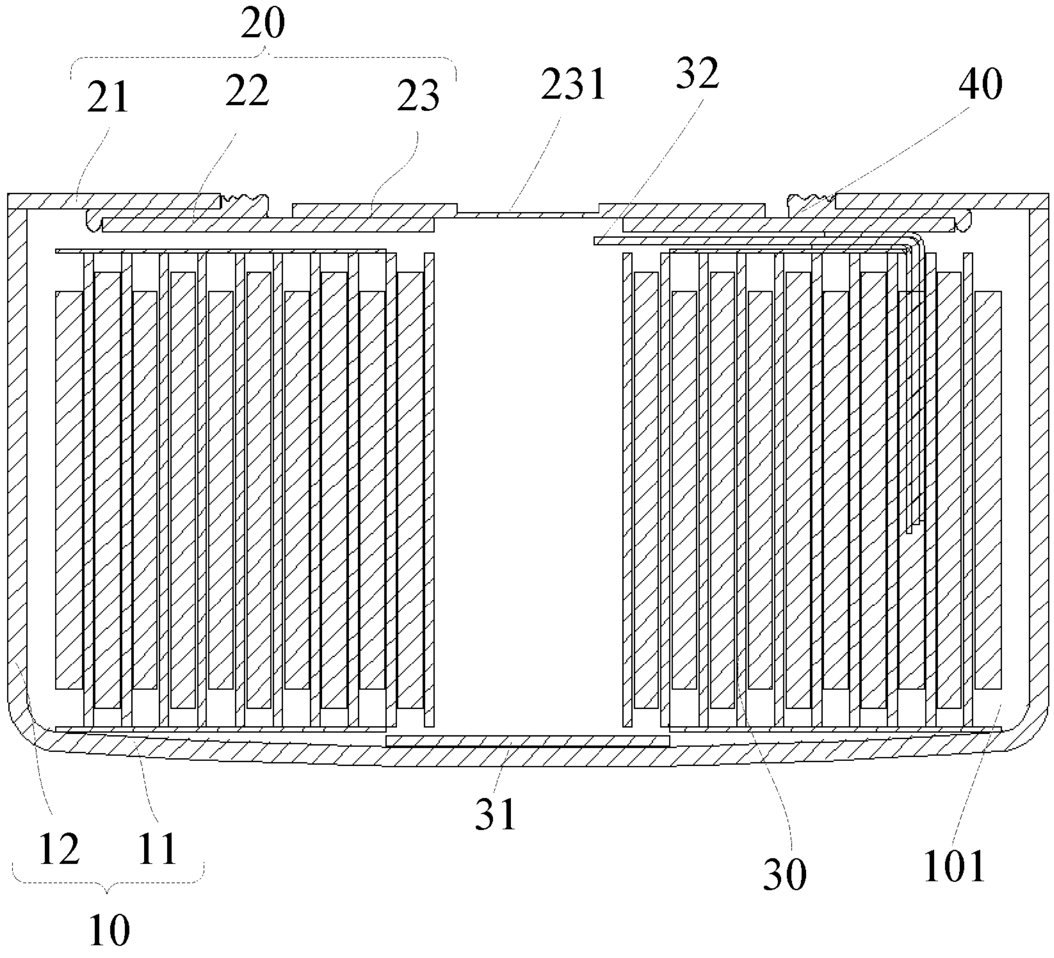
FIG. 1 is a schematic diagram of a first structure of a button cell provided in the present disclosure.

10—housing; 101—accommodating chamber;
11—bottom wall; 12—side wall;
20—cover assembly; 21—top cover;
22—conductive member; 221—injection port;
222—counter bore; 223—boss;
23—sealing member; 231—thinning area;
30—electrode assembly; 31—first tab;
32—second tab; 40—sealing rubber ring.

DESCRIPTION OF EMBODIMENTS

In the description of this specification, the description of the terms "one implementation", "some implementations", "schematic implementations", "examples", "specific examples", or "some examples" and the like means that the specific features, structures, materials or characteristics described in combination with implementations or examples are included in at least one implementation or example of the present disclosure. In this specification, the schematic representation of the above terms does not necessarily refer to the same implementation or example. Moreover, the specific features, structures, materials, or characteristics described may be combined in an appropriate manner in any one or more implementations or examples.

It should be noted that the terms "first" and "second" are used only for descriptive purposes and cannot be understood to indicate or imply relative importance or implicitly designate the number of indicated technical features. Therefore, the features defined with "first" or "second" may explicitly or implicitly include at least one of the features. In the description of the present disclosure, "a plurality of" means at least two, such as two, three and the like, unless otherwise specifically defined.

In the present disclosure, unless otherwise clearly specified and defined, the terms "mounting", "connection/connecting", "fixing" and the like should be understood in a broad sense. For example, it may be a fixed connection or a detachably connection, or may be integrated; it may be a mechanical connection, or may be an electrical connection or may communicate with each other; it may be directly connected, or indirectly connected by an intermediate medium, or allow communication within two elements or the interaction between two elements. For those of ordinary skill in the art, the specific meanings of the above terms in the present disclosure may be understood according to the specific situation.

In the present disclosure, unless otherwise expressly specified and defined, a first feature being "above" or "below" a second feature may refer to the first feature and the second feature being in direct contact, or the first feature and the second feature being not in direct contact but being in contact through a medium therebetween. Moreover, the first feature being "over", "above" and "on" the second feature may mean that the first feature is directly above and diagonally above the second feature, or simply indicate that the horizontal height of the first feature is higher than that of the second feature. The first feature being "under", "below" and "beneath" the second feature may mean that the first feature is directly below and diagonally below the second feature, or simply indicate that the horizontal height of the first feature is less than that of the second feature.

In the above description, the description of the reference terms "one embodiment", "some embodiments", "examples", "specific examples", or "some examples" and the like means that the specific features, structures, materials or characteristics described in combination with embodiments or examples are included in at least one embodiment or example of the present disclosure. In this specification, the schematic representation of the above terms does not necessarily refer to the same embodiment or example. Moreover, the specific features, structures, materials, or characteristics described may be combined in an appropriate manner in any one or more embodiments or examples. Further, without contradicting with each other, those skilled in the art may integrate and combine different embodiments or examples and the features of the different embodiments or examples described in this specification.

A button cell refers to a cell that is shaped like a button, and generally has a large diameter and a thin thickness. Due to the small volume of the button cell, it has been widely used in a variety of miniature electronic devices, for example, the wearable electronic device field and the medical product field and the like. In the prior art, the button cell includes a housing, a conductive member and a sealing member. The housing is provided with a through hole that communicates with a chamber for accommodating an electrolyte, the conductive member covers the through hole and is disposed outside of the button cell, and the conductive member is attached to the housing through a sealing rubber ring; and the sealing member covers an injection port of the conductive member. However, since the interior of the button cell is a closed space, the existing button cell has a problem of low safety and stability.

In order to solve the above problem, the present disclosure provides a button cell and an electronic device. By disposing a conductive member on a side of a top cover facing an accommodating chamber, an extrusion force of the conductive member to the top cover is larger than an adhesive force between a conductive member that is disposed on a side of a top cover away from the accommodating chamber and the top cover in the prior art, in this way, the tolerance of the conductive member to the pressure inside the button cell is increased, thereby reducing the damage caused when the battery explosion, and further enhancing the safety and the stability of the button cell.

A button cell and an electronic device provided in the present disclosure will be described in detail below with reference to the specific embodiments.

Figure 2:
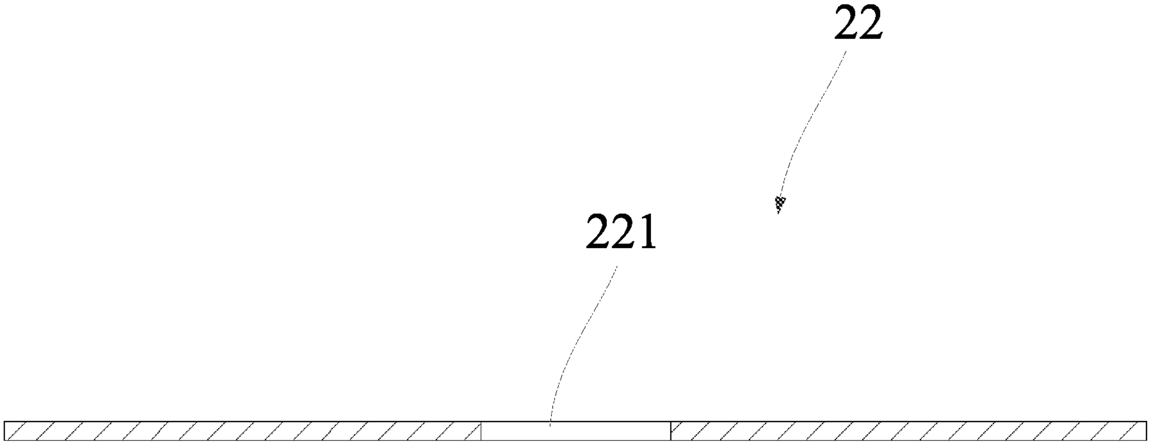
FIG. 2 is a structural schematic diagram of a conductive member in the button cell provided in FIG. 1.

FIG. 1 is a schematic diagram of a first structure of a button cell provided in the present disclosure; and FIG. 2 is a structural schematic diagram of a conductive member in the button cell provided in FIG. 1.

The present disclosure provides a button cell including a housing 10 and a cover assembly 20; the housing 10 includes a bottom wall 11 and an annular side wall 12, a bottom end of the side wall 12 is integrally formed with the bottom wall 11; the cover assembly 20 includes a top cover 21 having a through hole at its central area and a conductive member 22 covering the through hole, and the conductive member 22 is connected with the top cover 21 in an insulated manner; an outer edge of the top cover 21 is welded to a top end of the side wall 12 to form an accommodating chamber 101 accommodating an electrode assembly 30 and an electrolyte; an outer surface of the outer edge of the top cover 21 has a welding mark, with a welding penetration extending in a direction from the top cover 21 to the side wall 12; and the conductive member 22 is disposed on a side of the top cover 21 facing the accommodating chamber 101.

A cross-section of the housing 10 may be of any shape such as a circular shape, an elliptical shape, and a polygonal shape. Here, it is not limited in the present disclosure.

The through hole is disposed on the top cover 21, so that the top cover 21 forms an annular structure. The through hole may be of a circular shape, an elliptical shape, a polygonal shape and the like, and is not specifically limited herein.

The electrode assembly 30 is located within the accommodating chamber 101. The electrode assembly 30 includes a positive electrode sheet, a negative electrode sheet and a separator for separating the positive electrode sheet and the negative positive electrode sheet; a first tab 31 is disposed on the positive electrode sheet, and the first tab 31 may be disposed on the positive electrode sheet by welding, a second tab 32 is disposed on the negative electrode sheet, and the second tab 32 may be disposed on the negative electrode sheet by welding; during a winding process, the positive electrode sheet, the negative electrode sheet and the separator are wound layer by layer from a winding head end in the same direction and finally form the electrode assembly 30.

The first tab 31 and the housing 10 are electrically connected by welding and the like, and the second tab 32 and the conductive member 22 are also electrically connected by welding or bonding. The housing 10 and the conductive member 22 are electrically connected with the positive electrode and the negative electrode of the electronic device, respectively, so that the electrode assembly 30 supplies electric energy to the electronic device through the housing 10 and the conductive member 22.

Since the electrode assembly 30 supplies electric energy to the electronic device through the housing 10 and the conductive member 22, the housing 10 and the conductive member 22 may be made of metal material, such as stainless steel, copper, iron, aluminum and other metal material.

The conductive member 22 is disposed on the side of the top cover 21 facing the accommodating chamber 101, and abuts against an abutting surface of the top cover 21. The through hole is covered by the conductive member 22, and the conductive member 22 and the top cover 21 are connected in an insulated and hermetical manner. The insulated and hermetical connection between the conductive member 22 and the top cover 21 may be achieved by bonding with an insulated seal ring, or may be realized by other ways, which is not specifically set herein.

An injection port 221 for injecting the electrolyte into the accommodating chamber 101 is also disposed in the conductive member 22, and may be of any shape such as circle, quadrilateral, polygon and the like. In one embodiment, the injection port 221 is concentrically disposed with the conductive member 22, and the conductive member 22 is concentrically disposed with the accommodating chamber 101 for accommodating the electrode assembly 30.

It should be noted that in order to improve the connection sealability between the conductive member 22 and the top cover 21, the conductive member 22 may be bonded to an inner wall of top cover 21 through a sealing rubber ring 40 by means of heating and pressurizing. In this way, the bonding reliability of the sealing rubber ring 40 may be improved, thereby enhancing the connection sealability between the conductive member 22 and the top cover 21.

In the button cell provided in the present disclosure, by providing the conductive member 22 on the side of the top cover 21 facing the accommodating chamber 101, an extrusion force of the conductive member 22 to the top cover 21 is larger than an adhesive force between a conductive member disposed on a side of a top cover away from the accommodating chamber and the top cover in the prior art, thereby increasing the tolerance of the conductive member 22 to the pressure inside the button cell, reducing the damage caused by the button cell explosion, and improving the safety and stability of the button cell.

Optionally, the cover assembly 20 further includes a sealing member 23 covering an injection port 221, the sealing member 23 is located on a side of the conductive member 22 facing away from the accommodating chamber 101, and the abutting surface between the conductive member 22 and an inner wall of the top cover 21 is a horizontal plane. The abutting surface between the conductive member 22 and the inner wall of the top cover 21 is configured to be a horizontal plane, so that the structure of the conductive member 22 is simple, thereby reducing the processing cost of the button cell.

Exemplarily, as shown in FIG. 1 and FIG. 2, the top cover 21 is in a disc shape, the through hole is a circular hole, the conductive member 22 is in a disc shape, and a diameter of the through hole is smaller than a diameter of the conductive member 22. Therefore, an edge of conductive member 22 and an edge of through hole are at least partially stacked in a radial direction, which increases the bearing capacity of the conductive member 22 on the pressure in the button cell, and the through hole and the conductive member 22 are closely bonded through the sealing rubber ring 40 by means of heating and pressurizing, which improves the sealing performance of the button cell.

Since the fact that the larger a size of one-sided stacked portion of the edges of the conductive member 22 and of the through hole in the radial direction, the better the tolerance of the conductive member 22 to the pressure inside the button cell, in one embodiment, the size of the one-sided stacked portion of the conductive member 22 and the through hole in the radial direction is greater than or equal to 1 mm and the diameter difference between the conductive member 22 and the top cover 21 is less than or equal to 0.05 mm. In this way, the contact area between the conductive member 22 and the through hole is increased, thereby increasing the tolerance of the conductive member 22 to the internal pressure of button cell.

Figure 3:
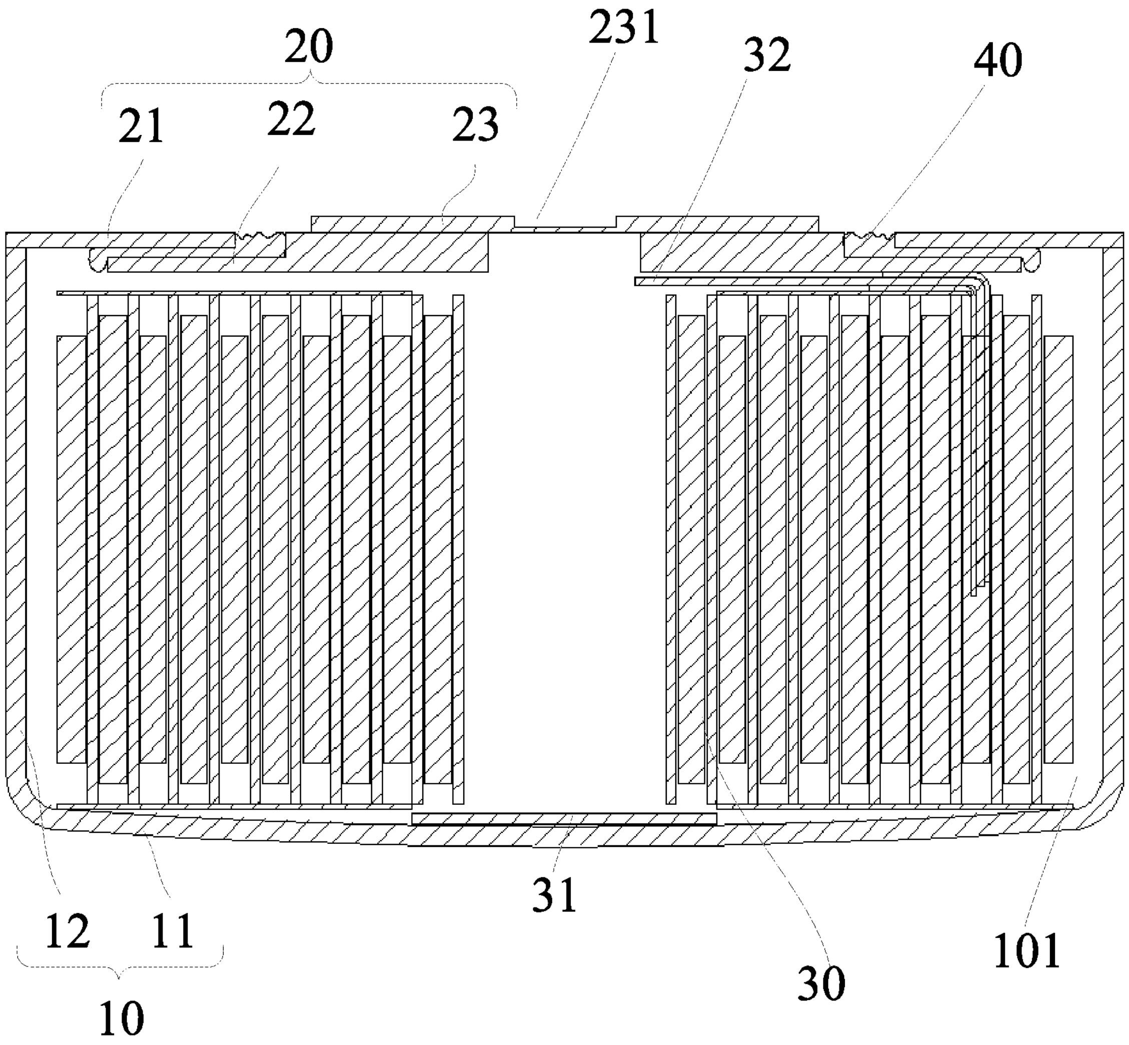
FIG. 3 is a schematic diagram of a second structure of a button cell provided in the present disclosure.
Figure 4:
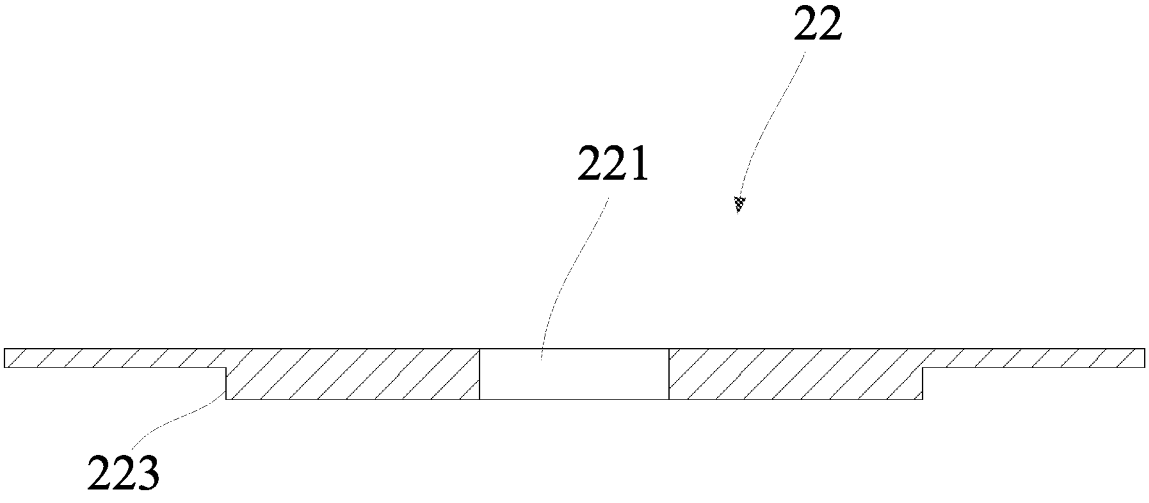
FIG. 4 is a structural schematic diagram of a conductive member in the button cell provided in FIG. 3.

FIG. 3 is a schematic diagram of a second structure of a button cell provided in the present disclosure; and FIG. 4 is a structural schematic diagram of a conductive member in the button cell provided in FIG. 3.

Optionally, as shown in FIG. 3 and FIG. 4, the conductive member 22 is provided with a boss 223 which is arranged through the through hole, and the boss 223 is disposed on a surface of the conductive member 22 abutting against the top cover 21. A surface of the conductive member 22 facing the accommodating chamber is a plane. The injection port 221 penetrates the boss 223, and a center of the boss 223 coincides with a center of the injection port 221.

By hermetically connecting the boss 223 with a hole wall of the through hole via the sealing rubber ring 40, the contact area between the conductive member 22 and the through hole is further increased, which not only improves the hermeticity between the conductive member 22 and the through hole, but also enhances the bearing capacity of the conductive member 22 to the internal pressure of the button cell.

Further, an end surface of the boss 223 away from the accommodating chamber 101 flushes with an end surface of the housing 10 away from the accommodating chamber 101, or the end surface of the boss 223 away from the accommodating chamber 101 is located between the end surface of the housing 10 away from the accommodating chamber 101 and an end surface of the housing 10 close to the accommodating chamber 101. In this way, the overall structure of the button cell is more compact and the overall aesthetics of the button cell is improved.

It should be noted that, according to actual requirements, the center of the boss 223 may not coincide with the center of the injection port 221, and it is not specifically set herein.

Figure 5:
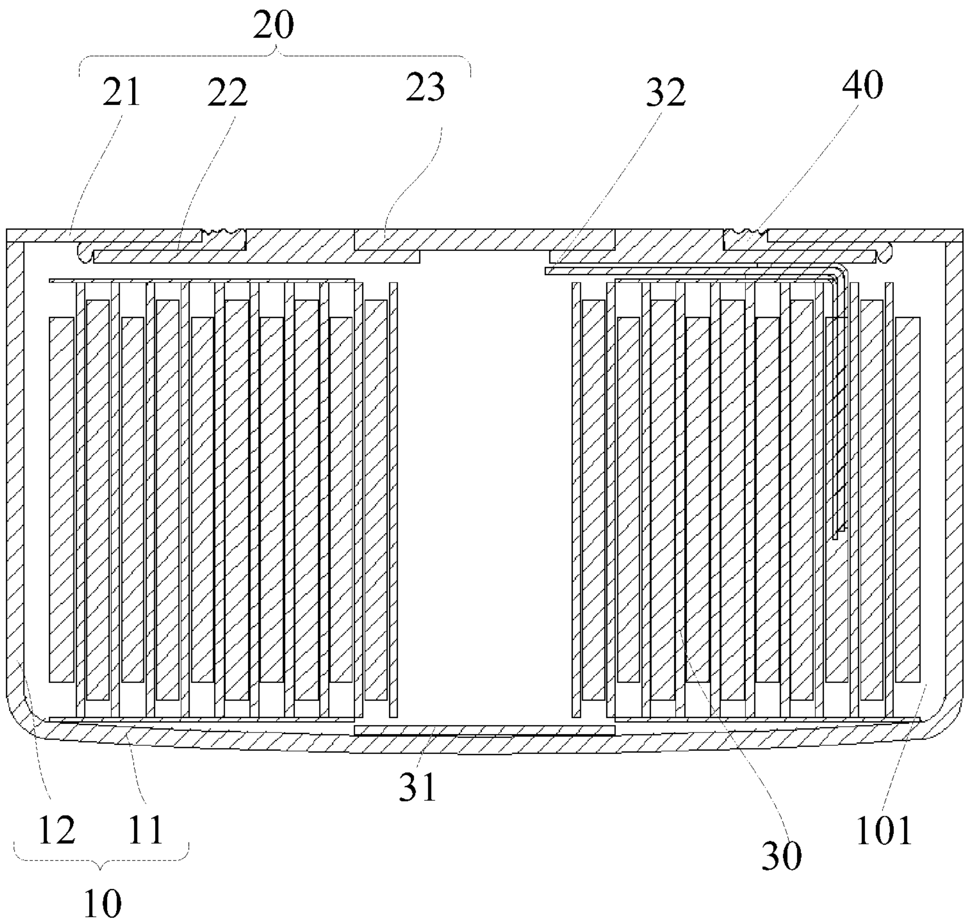
FIG. 5 is a schematic diagram of a third structure of a button cell provided in the present disclosure.
Figure 6:
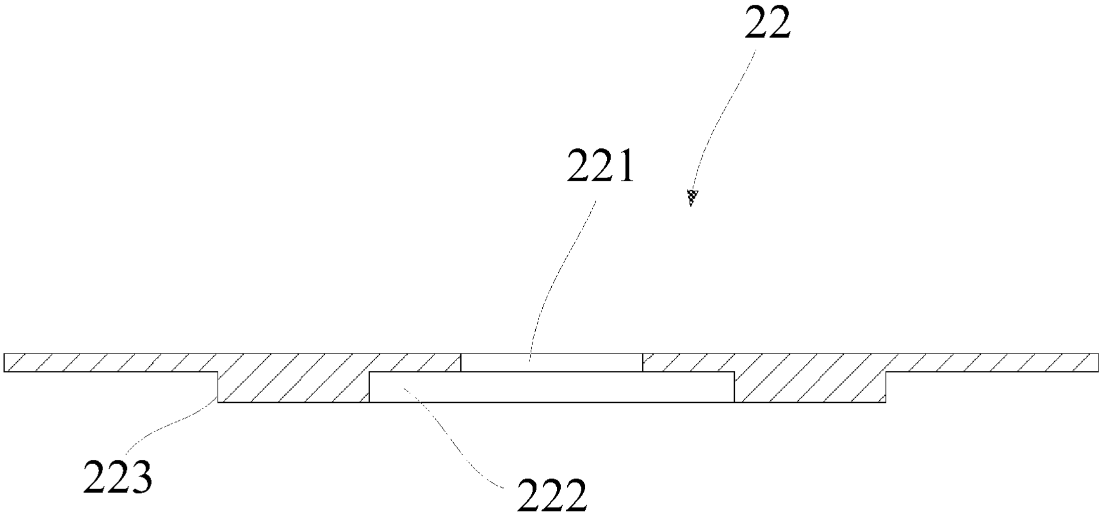
FIG. 6 is a structural schematic diagram of a conductive member in the button cell provided in FIG. 5.

FIG. 5 is a schematic diagram of a third structure of a button cell provided in the present disclosure; and FIG. 6 is a structural schematic diagram of a conductive member in the button cell provided in FIG. 5.

Optionally, as shown in FIG. 5 and FIG. 6, a counter bore 222 is disposed at an end of the boss 223 away from the accommodating chamber 101, and communicates with the injection port 221. A center of the counter bore 222 coincides with the center of the injection port 221, and the sealing member 23 is disposed in the counter bore. After the electrolyte is injected into the accommodating chamber 101 through the injection port 221, a joint between the sealing member 23 and the counter bore 222 is welded outside the top cover 21, thereby improving the sealing performance between the sealing member 23 and the injection port 221.

A shape of the counter bore 222 is the same as that of the injection port 221, that is, when the injection port 221 is circular, the counter bore 222 is also circular.

Exemplarily, in an extension direction of the injection port 221, a thickness of a portion of the conductive member 22 abutting against the top cover 21 is between 0.05 mm and 0.2 mm, a thickness of the boss 223 is between 0.1 mm and 0.5 mm, and a depth of the counter bore 222 may be between 0.05 mm and 0.45 mm.

Figure 7:
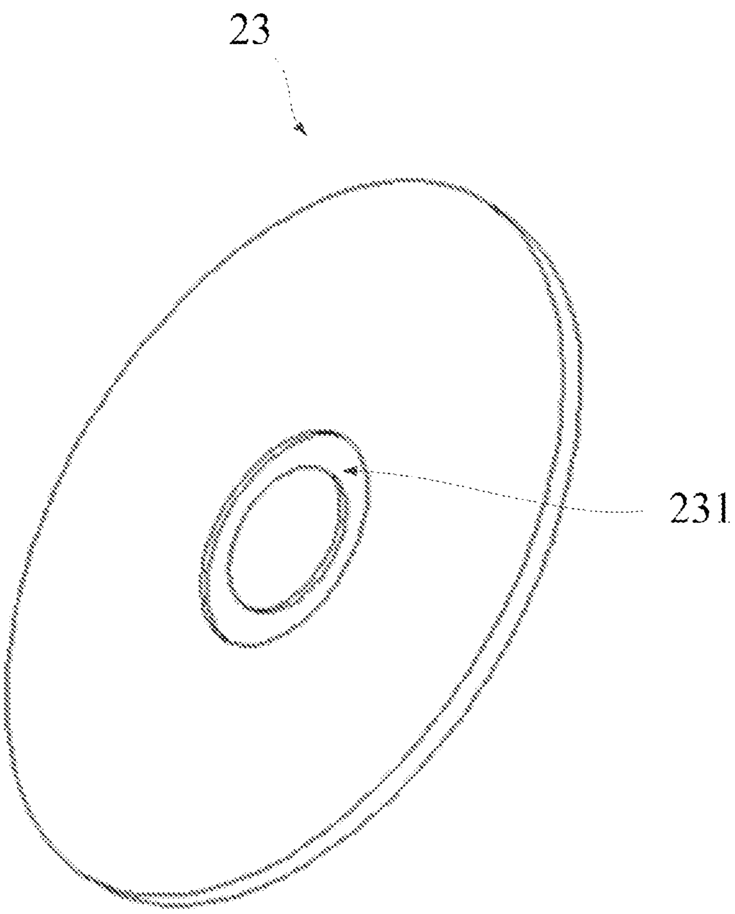
FIG. 7 is a schematic diagram of a first structure of a sealing member provided in the present disclosure.
Figure 8:
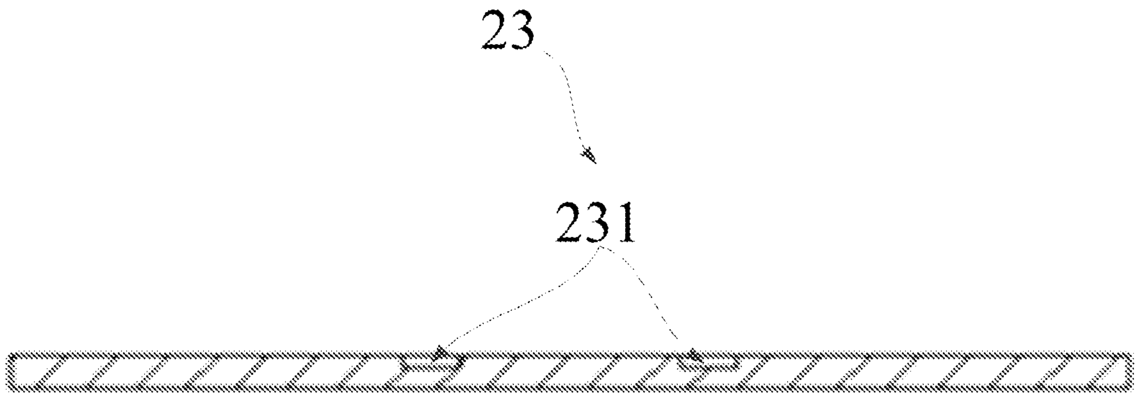
FIG. 8 is a structural schematic diagram of a cross-section of the sealing member of FIG. 7.
Figure 9:
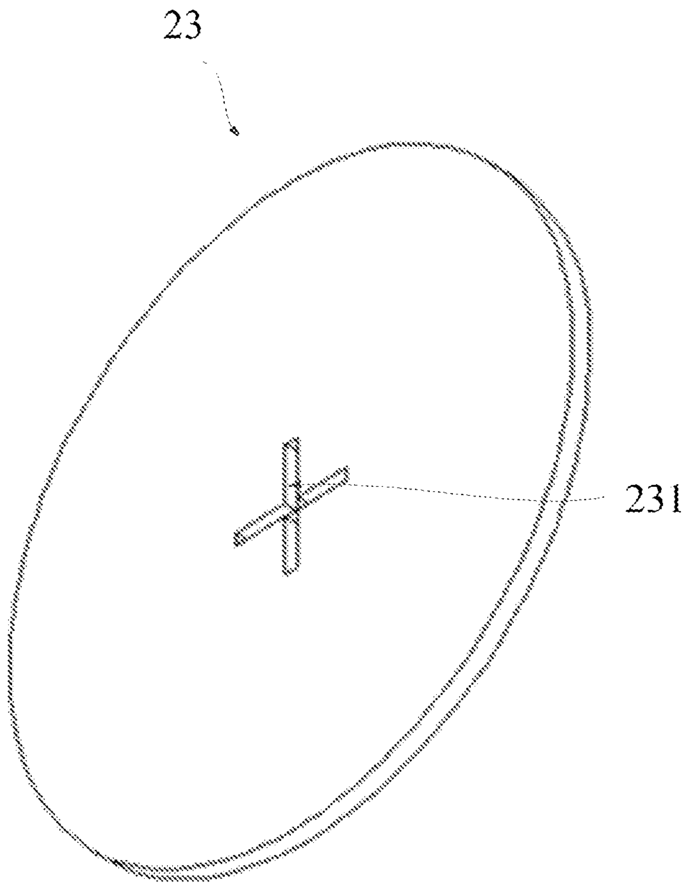
FIG. 9 is a schematic diagram of a second structure of a sealing member provided in the present disclosure.
Figure 10:
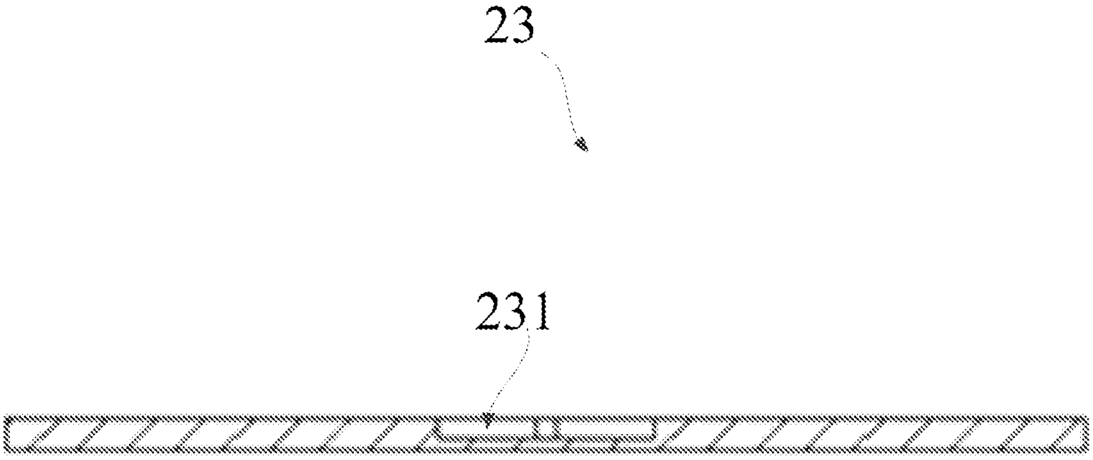
FIG. 10 is a structural schematic diagram of a cross-section of the sealing member of FIG. 9.
Figure 11:
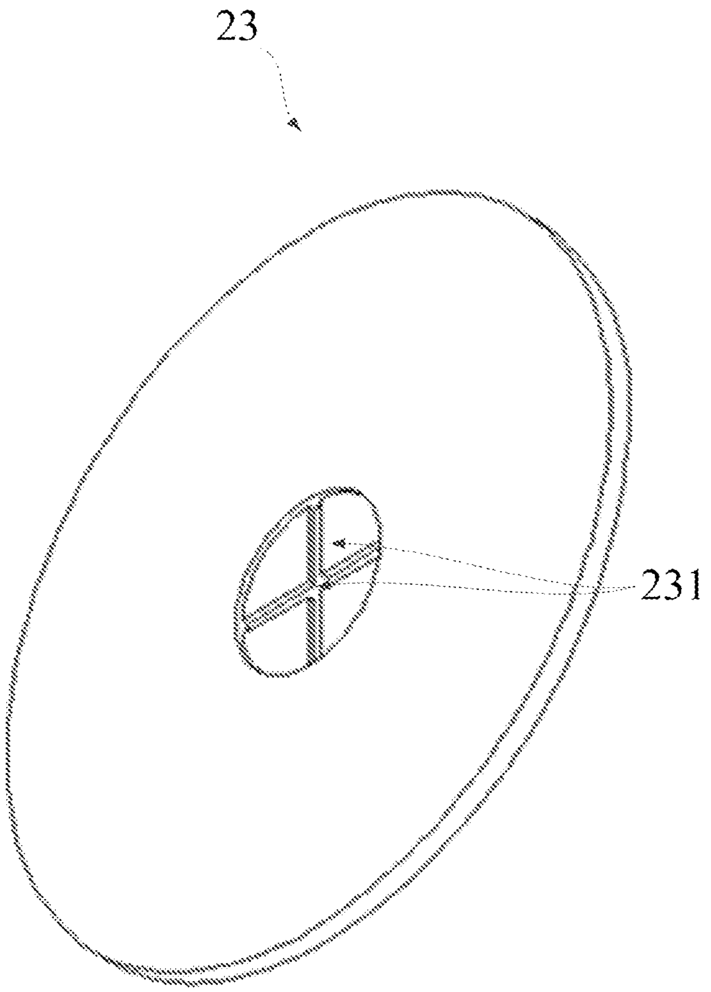
FIG. 11 is a schematic diagram of a third structure of a sealing member provided in the present disclosure.
Figure 12:
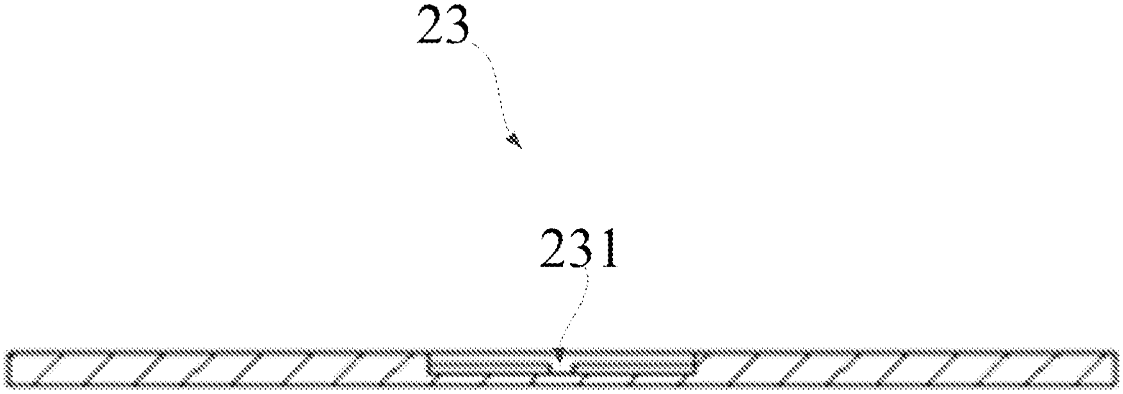
FIG. 12 is a structural schematic diagram of a cross-section of the sealing member of FIG. 11.
Figure 13:
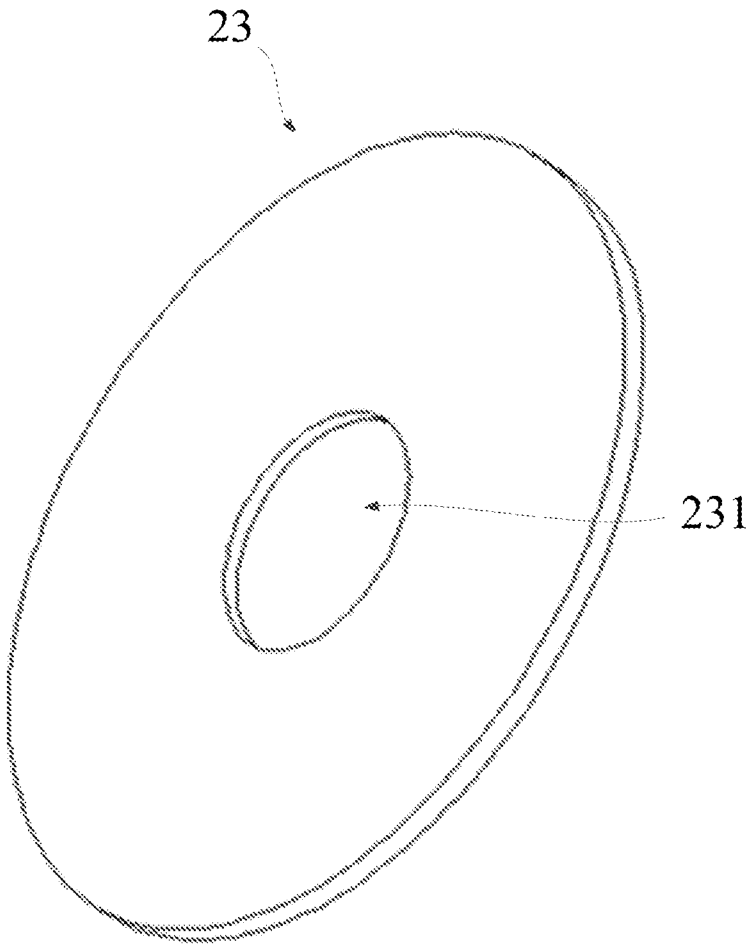
FIG. 13 is a schematic diagram of a fourth structure of a sealing member provided in the present disclosure.
Figure 14:
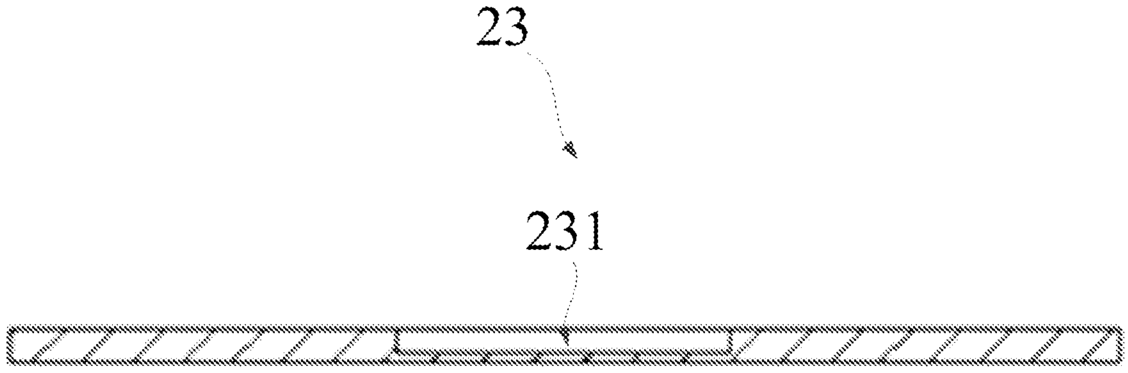
FIG. 14 is a structural schematic diagram of a cross-section of the sealing member of FIG. 13.

FIG. 7 is a schematic diagram of a first structure of a sealing member provided in the present disclosure; FIG. 8 is a structural schematic diagram of a cross-section of the sealing member of FIG. 7; FIG. 9 is a schematic diagram of a second structure of a sealing member provided in the present disclosure; FIG. 10 is a structural schematic diagram of a cross-section of the sealing member of FIG. 9; FIG. 11 is a schematic diagram of a third structure of a sealing member provided in the present disclosure; FIG. 12 is a structural schematic diagram of a cross-section of the sealing member of FIG. 11; FIG. 13 is a schematic diagram of a fourth structure of a sealing member provided in the present disclosure; and FIG. 14 is a structural schematic diagram of a cross-section of the sealing member of FIG. 13.

Optionally, the sealing member 23 is provided with a thinning area 231.

Since the button cell is a closed space, the pressure in the accommodating chamber 101 is relatively large, and when the pressure is too large, the damage degree will be large if a battery explosion occurs. In order to improve the safety and stability of the button cell, in the present disclosure, the thinning area 231 is provided in the sealing member 23. Since the pressure bearing capacity of the thinning area 231 is smaller than that of a region without the thinning area 231, when the internal pressure of the button cell is increased to a maximum critical value of the pressure that the thinning area 231 can bear, the thinning area 231 may crack or be directly broken up under the drive of pressure, and the pressure inside the button cell may be decreased by venting from a cracked or broken position of the thinning area 231; and at this time, the internal pressure of the battery cell does not reach a maximum critical value of the pressure that a non-thinning area can bear. Therefore, if the battery explodes, the damage effect on the battery will be greatly reduced, thereby enhancing the safety and stability of the button cell.

In the button cell provided in the embodiments of the present disclosure, the thinning area 231 is provided in the sealing member 23. Since the pressure that the thinning area 231 can bear is smaller than the pressure that the non-thinning area can bear, so when the internal pressure of the button cell is increased to a level of pressure that the thinning area 231 cannot bear, the thinning area 231 may crack or even be broken up. In this way, the pressure in the button cell may be decreased by venting from the thinning area 231 to realize the purpose that the pressure in the button cell can be released in advance, thereby reducing the damage caused by the explosion of button cell and avoiding the technical problem that the internal pressure of the button cell is too large to be discharged in advance, which may cause the damage after explosion to be relative large.

Optionally, the thinning area 231 is located on a side of the sealing member 23 facing away from the accommodating chamber 101. By disposing the thinning area 231 on the side of the sealing member 23 facing away from the accommodating chamber 101, that is, a side of the sealing member 23 facing the accommodating chamber 101 is a flat plane, in this way, the safety and stability of the button cell are improved, while avoiding reduced battery life caused by the electrolyte in the accommodating chamber 101 corroding the connection between the thinning area 231 and the area that is not thinned.

In an optional implementation, a groove is provided on the side of the sealing member 23 facing away from the accommodating chamber 101, such groove forming the thinning area 231. The groove is provided on the side of the sealing member 23 facing away from the accommodating chamber 101, so that the groove forms the thinning area 231, which is simple in structure and low in processing cost.

Optionally, the thinning area 231 may be at least one of a cross groove, a ring groove, or a circle groove.

For example, as shown in FIG. 9 and FIG. 10, the thinning area 231 is a cross groove; as shown in FIG. 7 and FIG. 8, the thinning area 231 is a circular ring groove; as shown in FIG. 11 and FIG. 12, the thinning area 231 is a combination of a circular groove and a cross groove; as shown in FIG. 13 and FIG. 14, the thinning area 231 is a circle groove. The thinning area 231 may also be an elliptical groove, a rectangular groove, a groove of any other regular shape or a combination of grooves of at least two shapes; or may be a groove of any irregular shape; or may be a combination of grooves having regular or irregular shape, which is not specifically limited herein.

Optionally, in order to facilitate processing of the thinning area 231, the center of the thinning area 231 coincides with the center of the injection port 221, which facilitates to align the center of the thinning area 231 at the time of processing the thinning area 231.

In an optional implementation, a groove depth of the groove is 0.01 mm-0.1 mm, in this way, while meeting the strength requirements of the sealing member 23 during normal operation, the button cell may be discharged and depressurized in advance when the internal pressure of the button cell is too large, thereby reducing the damage caused by the explosion of button cell, and improving the safety and stability of the button cell.

Further, the thinning area 231 and the sealing member 23 may be integrally formed, so the processing procedures for forming the sealing member 23 and the thinning area 231 are reduced, thereby reducing the processing cost.

Optionally, the sealing member 23 may be a sheet structure, that is, the sealing member 23 is a sealing sheet. In this way, a side of the sealing member 23 facing the accommodating chamber 101 is a flat plane, so the strength of the sealing member 23 can be improved, thereby improving the use reliability of the sealing member 23.

In addition, the sealing member 23 is provided as a sealing sheet, that is, the thickness of the sealing member 23 is relatively small. When the thickness of the sealing member 23 is relatively small, the pressure that the sealing member can bear is relatively small. Therefore, when the internal pressure of the button cell exceeds the pressure that the sealing member 23 can bear and the button cell explodes, the damage caused by the cell explosion can be reduced.

The present disclosure also provides an electronic device including an electronic device body and a button cell, the button cell providing electric energy for the electronic device body.

The structure of the button cell in the electronic device provided in the present disclosure is the same as the structure of the button cell described above, and can bring the same or similar technical effects, which is not described herein again.

Finally, it should be noted that the above embodiments are only used to illustrate the technical solutions of the present disclosure, rather than limit thereto; although the present disclosure is explained in detail with reference to the above embodiments, those ordinary skill in the art should understand that they may still modify the technical solutions recorded in the above embodiments or equivalently replace some or all of the technical features of the above embodiments; and these modifications or replacements do not make the essence of corresponding technical solution depart from the scope of the technical solutions of the embodiments of the present disclosure.

What is claimed is:

1. A button cell, comprising a housing, a cover assembly and an injection port; wherein, the housing comprises a bottom wall and an annular side wall, a bottom end of the side wall and the bottom wall being integrally formed;

the cover assembly comprises a top cover having a through hole at its central area and a conductive member covering the through hole, the conductive member being connected with the top cover by a sealing rubber ring;

an outer edge of the top cover is welded with a top of the side wall to form an accommodating chamber for accommodating an electrode assembly and an electrolyte, an outer surface of the outer edge of the top cover has a welding mark, and a welding penetration extends in a direction from the top cover to the side wall; and the conductive member is disposed on a side of the top cover facing the accommodating chamber;

wherein a boss arranged through the through hole is disposed on the conductive member, the boss is disposed on a surface of the conductive member abutting against the top cover, and a side of the conductive member facing the accommodating chamber is a plane;

the size of a one-sided stacked portion of the conductive member and the through hole in a radial direction is greater than or equal to 1 mm and a diameter difference between the conductive member and the top cover is less than or equal to 0.05 mm;

wherein the button cell further comprises a sealing member covering the injection port, a groove is disposed on a side of the sealing member facing away from the accommodating chamber, the groove forms a thinning area, and a center of the thinning area coincides with the center of the injection port.

2. The button cell according to claim 1, wherein the conductive member is provided with an injection port for injecting the electrolyte into the accommodating chamber;

the sealing member is located on a side of the conductive member facing away from the accommodating chamber.

3. The button cell according to claim 1, wherein the injection port penetrates the boss, and a center of the boss coincides with a center of the injection port.

4. The button cell according to claim 3, wherein an end surface of the boss away from the accommodating chamber flushes with an end surface of the housing away from the accommodating chamber; or the end surface of the boss away from the accommodating chamber is located between the end surface of the housing away from the accommodating chamber and an end surface of the housing close to the accommodating chamber.

5. The button cell according to claim 4, wherein an end of the boss away from the accommodating chamber is provided with a counter bore, the counter bore communicates with the injection port, and a center of the counter bore coincides with the center of the injection port.

6. The button cell according to claim 5, wherein a distance between the end surface of the boss away from the accommodating chamber and an end surface of the boss close to the accommodating chamber is a thickness of the boss, and the thickness of the boss is 0.1 mm-0.5 mm.

7. An electronic device comprising an electronic device body and the button cell according to claim 1, the button cell providing electric energy for the electronic device body.

* * * * *